United States Patent [19]

Leman, Jr.

[11] 4,314,688
[45] Feb. 9, 1982

[54] GATE VALVE

[75] Inventor: A. Louis Leman, Jr., Magnolia, Tex.

[73] Assignee: Southwest Oilfield Products, Inc., Houston, Tex.

[21] Appl. No.: 71,996

[22] Filed: Sep. 4, 1979

[51] Int. Cl.³ .............................................. F16K 25/00
[52] U.S. Cl. .................................... 251/191; 251/158; 251/194
[58] Field of Search ................ 251/158, 189, 191, 194

[56] References Cited

U.S. PATENT DOCUMENTS

| | | | |
|---|---|---|---|
| 1,793,094 | 2/1931 | King | 251/191 |
| 2,238,357 | 4/1941 | Allen | 251/191 |
| 2,331,557 | 10/1943 | Lorehn | 251/191 |
| 4,073,308 | 2/1978 | Stith | 251/191 |

FOREIGN PATENT DOCUMENTS

| | | | |
|---|---|---|---|
| 116597 | 3/1943 | Australia | 251/158 |
| 524395 | 12/1953 | Belgium | 251/191 |

*Primary Examiner*—Harold W. Weakley
*Attorney, Agent, or Firm*—Cesari and McKenna

[57] ABSTRACT

An improved gate valve for high fluid pressure applications has a housing with aligned inlet and outlet passages and a well intercepting those passages. A piston-type gate is slidably positioned in the well and movable by conventional means between an open position wherein it does not intercept the inlet and outlet passages and a closed position wherein it blocks those passages and seats against the bottom of the well. The gate is fitted with a special seal which includes a circular section seated in a circumferential groove in the gate located above the inlet and outlet passages and a pair of lengthwise sections extending from diametrically opposite locations on the circular section toward the end of the gate at opposite sides thereof, those sections being located transversely with respect to the valve inlet and outlet passages. Finally, the seal includes a third section which is recessed into a slot formed in the end of the gate and connected at its opposite ends to the free ends of the lengthwise seal segments. When the gate is open, fluid is free to flow from the inlet to the outlet passage under the gate. As the gate is moved toward its closed position in order to shut off the valve, it first occludes the valve inlet passage thereby gradually reducing fluid flow through the valve. The circular seal section prevents flow across the top of the gate.

10 Claims, 7 Drawing Figures

U.S. Patent Feb. 9, 1982 Sheet 3 of 3 4,314,688
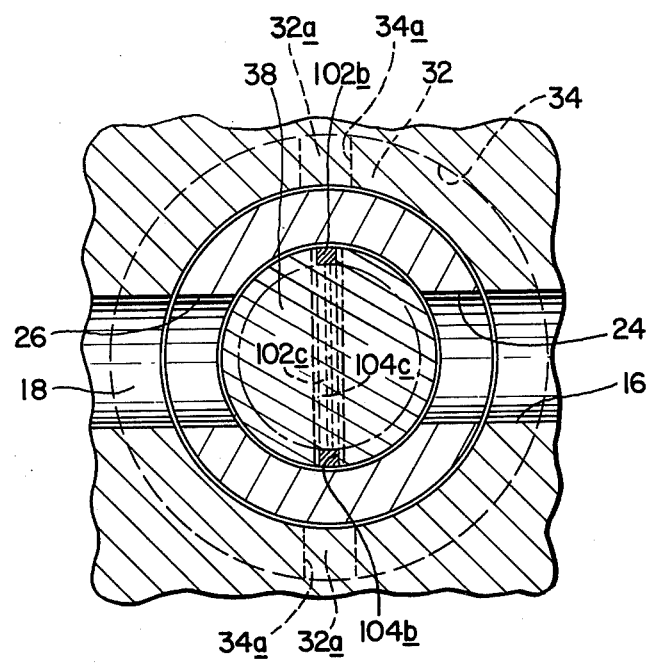
Fig. 5
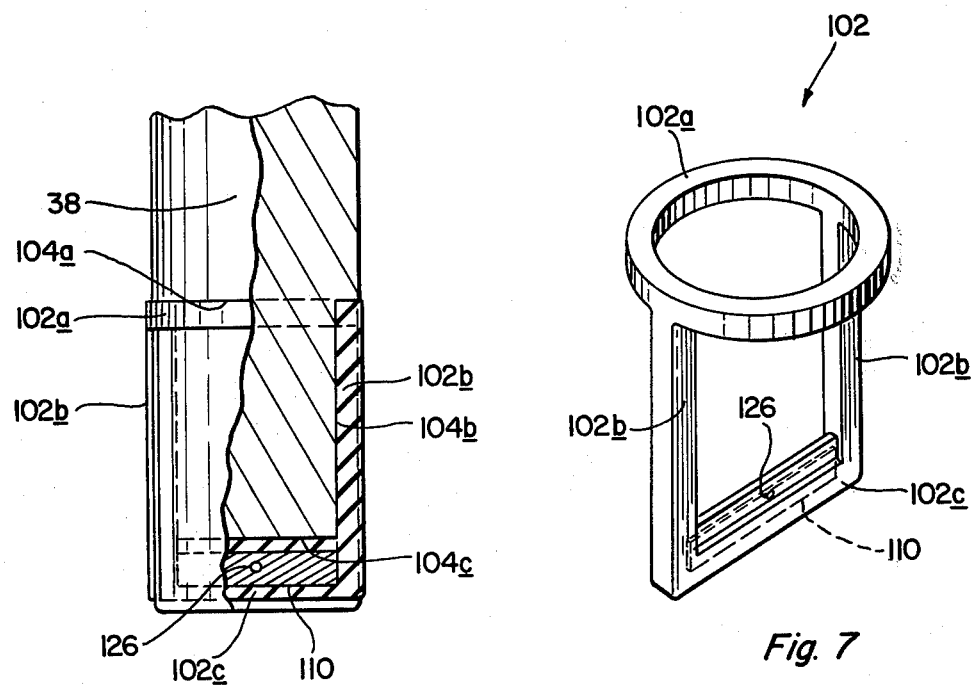
Fig. 6
Fig. 7

GATE VALVE

BACKGROUND OF THE INVENTION

This invention relates to a valve. It relates more particularly to an improved gate valve of the type wherein a piston or slab-type gate intercepts and blocks inlet and outlet openings in the valve housing to close the valve.

Gate valves of the type with which we are concerned here are used particularly in high fluid pressure applications. For example, they are used to control the flow of oil in oilfields and of water in hydroelectric installations. In one type of gate valve, the gate itself is solid and when the valve is closed, the gate blocks aligned inlet and outlet openings in the valve seats. In another type, the gate has a transverse passage through it situated so that, when the valve is in its open position, the gate passage is in register with the inlet and outlet openings in the valve seats and when the valve is closed the gate passage is out of register with those openings being separated therefrom by appropriate seals. The latter type of gate valve has an advantage over the former in that the gate is always positioned between the valve seats and the respective seals thereby protecting the seats and seals from fluid flow while the valve is in the open position.

However, both gate valve types are disadvantaged in that fluid flow is closed off by the movement of the gate across a circular inlet or outlet seat opening, which opening is usually surrounded by a seal. Consequently, fluid flow attains a very high velocity right at the point of closing, the point being formed by the near eclipse of the seat opening and the gate or gate opening. In other words, as the gate reaches its closed position, it intercepts the inlet or outlet seat opening, making it almost a point opening which creates a pressure drop of maximum magnitude at that point. The high velocity fluid flow through that very small opening tends to erode and damage the valve seat and gate surfaces so that subsequent opening and closing of the valve moves the damaged metal surfaces over the seals between the gate and the valve seats thereby damaging the seals and degrading the sealing ability of the valve.

Some valves are designed to minimize seal damage due to the aforesaid effects. For example, one type of valve of which I am aware sold under the name Cameron Type F provides for valve seat rotation with each valve closure so as to minimize the damage to a singular point or location on the seals. While that approach mitigates the problem and enlarges the time between required valve parts replacement and repair, it does not solve the problem. Moreover, that type valve is relatively expensive to manufacture.

SUMMARY OF THE INVENTION

Accordingly, the present invention aims to provide an improved gate valve for high pressure applications which can be opened and closed repeatedly while still maintaining its sealing effectiveness.

Another object of the invention is to provide a high pressure gate valve which requires a minimum amount of maintenance and repair.

Another object of the invention is to provide an improved valve of this type which suffers a minimum amount of seal damage due to high fluid velocities through the valve.

A further object of the invention is to provide a gate valve having the aforesaid advantages which is not appreciably more expensive to manufacture than prior valves of this general type.

Other objects will, in part, be obvious and will, in part, appear hereinafter.

The invention accordingly comprises the features of construction, combination of elements, and arrangement of parts which will be exemplified in the following detailed description, and the scope of the invention will be indicated in the claims.

Briefly, my gate valve comprises a more or less standard valve housing having aligned inlet and outlet passages intercepted by a generally perpendicular cylindrical well. The well is lined by a liner or sleeve having a closed lower end and a pair of openings at diametrically opposite points in its side wall, which openings are in register with the valve inlet and outlet passages. The sleeve has a diametric key or tab projecting up from its closed lower end which key is oriented more or less perpendicular to the axis of the sleeve openings. Suitable seals are provided between the sleeve and the valve housing above, below and between inlet and outlet passages to prevent fluid leakage between the sleeve and the housing. Alternatively, in some cases, that seal may be formed by a metal-to-metal taper with the housing.

Slidably positioned within the sleeve is a solid cylindrical piston or slab-type gate. As is customary with such a valve, the gate is slidable within the sleeve from an open or retracted position wherein it permits free flow of fluid from the valve inlet passage through the sleeve to the valve outlet passage and a closed or extended position wherein the gate blocks the openings in the sleeve and thus prevents fluid flow between the valve inlet and outlet passages. The piston-type gate is moved between its open and closed positions by a helically threaded stem attached to the gate which is turned by a handle in a nut mounted in a bonnet attached to the valve housing.

The valve gate is formed with a diametric slot in its lower end which registers with the aforementioned key projecting up from the lower end of the sleeve. Recessed into that slot is a reinforced seal segment whose opposite ends connect to lengthwise seal segments positioned in a pair of slots extending along the gate at opposite sides thereof. These side seal segments extend up beyond the sleeve openings when the gate is in its closed position and connect to the opposite sides of a circular seal segment contained in a circumferential slot in the gate positioned above the sleeve openings when the gate is in its closed position. Thus by itself, this seal, which is a unitary piece of elastomeric material, resembles somewhat the headstall and bit portions of a horse's bridle with the aforesaid reinforced seal segment constituting the bit.

When the gate is in its open position, the seal segment, being recessed into the end of the gate, is shielded from the fluid flow even under high pressure. When the valve is being closed and the sides of the gate progressively eclipse the sleeve openings, the circular seal segment prevents fluid flow between the valve inlet and outlet across the top of the gate while the lengthwise seal segments at opposite sides of the gate prevent such flow around the perimeter of the gate. However, as long as the gate is in a fully or partially open position, fluid is free to flow from the valve inlet under the gate to the valve outlet.

The velocity of such flow through those decreasing gaps or windows progressively increases to a high value, reaching a maximum just as the end of the gate intercepts the lower edges of the sleeve openings. However the velocity of the fluid flowing between the end of the gate and the sleeve end is still relatively low because of the relatively large flow areas present there. Finally, after the valve gate has blocked the sleeve openings and nearly stopped flow through the valve, the recessed seal segment at the end thereof seats on the key at the end of the sleeve and is compressed thereby completely preventing fluid flow under the gate.

Thus any damage due to high velocity fluid flow during valve closing (and opening) is limited to the areas located at the lower inside edges of the sleeve openings and the adjacent edges of the gate. If such damage should occur, however, it has no effect at all on the sealing capability of the valve because none of the aforesaid seal segments including the recessed segment at the end of the gate which ultimately effects total valve closure ever contact those eroded or damaged valve edges.

Thus the recessing of the valve segment at the end of the gate prevents that segment from being eroded by high velocity fluid flow through the valve. It also prevents that segment from deforming or extruding underneath the gate due to the pressure differential across the gate end during closure. As will be described in detail later, that seal segment is reinforced by a metal insert molded into it which maintains the segment as a rigid unit fastened to the end of the gate. This prevents the lengthwise seal segments from elongating when the valve is closed which could cause valve leakage.

Thus by the simple expedient of modifying the slab-type gate and valve sleeve as aforesaid of an otherwise more or less conventional gate valve, there results a vastly improved fluid shutoff device which is particularly suitable for handling fluids under high pressure such as might be found in oil fields, hydroelectric installations, chemical plants and other such environments. Yet the valve should not cost appreciably more than prior conventional gate valves of this general type. Accordingly, it should find wide application in situations demanding control of high pressure fluids.

BRIEF DESCRIPTION OF THE DRAWINGS

For a fuller understanding of the nature and objects of the invention, reference should be had to the following detailed description, taken in connection with the accompanying drawings, in which:

FIG. 5 is a sectional view along line 5—5 of FIG. 1;

FIG. 6 is a fragmentary sectional view showing the gate portion of the FIG. 1 valve in greater detail, and FIG. 7 is a perspective view on a still larger scale illustrating the gate seal used in the FIG. 1 valve.

DESCRIPTION OF THE PREFERRED EMBODIMENT

Figure 1:
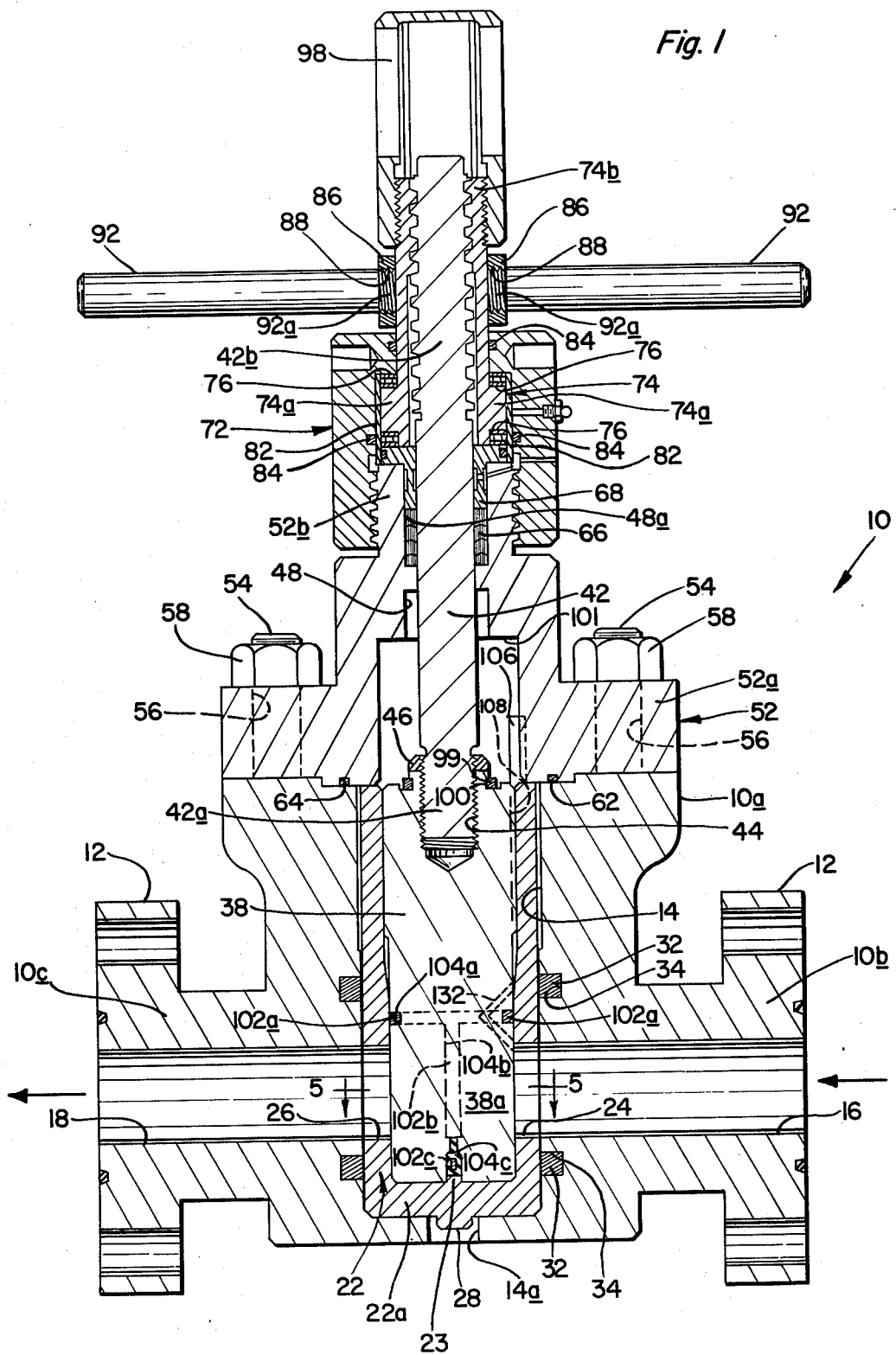
FIG. 1 is a vertical sectional view with parts shown in elevation of a gate valve embodying the principles of this invention and showing the valve gate in its fully closed position.

Referring now to FIG. 1 of the drawings, my valve includes the usual housing 10 having an upstanding main section 10a and inlet and outlet sections 10b and 10c projecting laterally from opposite sides of section 10a. Flanges 12 are provided at the free ends of sections 10b and 10c to facilitate connecting the valve to inlet and outlet conduits (not shown). A vertical cylindrical well or passage 14 is formed in housing section 10a extending from the top of that section almost to the bottom thereof. Also aligned inlet and outlet passages 16 and 18 extend through housing sections 10b and 10c including their flanges which passages intercept the well 14 at right angles.

Positioned in well 14 is a generally cylindrical sleeve 22 whose lower end 22a is closed and seats at the bottom of well 14. The side wall of sleeve 22 is formed with a pair of diametrically opposite inlet and outlet openings 24 and 26 which are aligned with the inlet and outlet passages 16 and 18. A key 28 projecting down from the sleeve bottom wall 22a engages in a slot or keyway 14a formed at the bottom of well 14 in order to maintain the alignment of the sleeve so that openings 24 and 26 remain in register with passages 16 and 18. Projecting up from sleeve bottom wall 22a is a diametric key or tab 23 which is disposed at right angles to the axis of openings 24 and 26 whose function will be detailed later. Fluid leakage between sleeve 22 and the valve body is prevented by a pair of O-ring seals 32 seated in circular grooves 34 formed in the side wall of well 14 above and below passages 16 and 18. These seals 32 are connected by a pair of lengthwise seal sections 32a (FIG. 5) seated in grooves 34a oriented parallel to key 28.

Slidably positioned in sleeve 22 is a generally cylindrical piston or slab-type gate 38 which will be described in more detail later. Suffice it to say at this point that the gate is slidable within sleeve 22 between open and closed positions by a stem 42 whose lower end 42a is threaded and turned down into a correspondingly threaded vertical hole 44 formed in the top of gate 38. A locknut 46 engaged around the threaded stem end 42a maintains the stem and gate in tight threaded engagement. Stem 42 extends up through a central passage 48 in a bonnet 52, the lower end of which seats against the top of the housing section 10a. The bonnet is secured to that section by a circular array of threaded studs 54 which project up from that housing section through openings 56 in the bonnet flange 52a. Nuts 58 turned down onto the ends of the studs clamp the bonnet to the housing section and an O-ring seal 62 seated in a circular groove 64 to the underside of bonnet flange 52a prevents fluid leakage between the bonnet and the housing.

An upper section 48a of the bonnet passage 48 is enlarged to receive a quantity of packing 66 which is compressed between stem 42 and the wall of passage 48a by a collet-like packing follower 68 which is engaged around stem 42 and positioned in the passage section 48a at the upper end 52b of the bonnet. That end has a reduced diameter and is exteriorly threaded to accept an interiorly threaded cap 72.

Positioned in cap 72 is an elongated, cylindrical, interiorly threaded nut 74 which is engaged on the threaded upper end 42b of stem 42 and projects out through the top of the cap. The lower end 74a of that nut, located inside the cap, is flanged and bears against the top of the packing follower 68 so that when the cap 72 is turned down onto the threaded end 52b of the bonnet, the packing follower 68 compresses the underlying packing, thereby making a tight rotary and sliding seal between the valve stem 42 and the bonnet 52. With this arrangement, the nut 74 is rotatable within cap 72, this motion being facilitated by a pair of bearing sets 76 positioned at the top and bottom of the nut flange 74a and operating between that flange and a cylindrical spacer 82 positioned between the nut flange and the inside wall of cap 72.

Suitable O-ring seals 84 are provided respectively between the packing follower 68 and spacer 82 and between the spacer and the inside wall of cap 72 and between the nut 74 and the cap 72 near the top thereof to contain grease in the thread and bearing area. The upper end of nut 74 projecting from the top of cap 72 is provided with a collar 86 having lateral threaded openings 88 for retaining the threaded ends 92a of a pair of handles 92 to facilitate turning the nut. Finally, the upper end 74b of nut 74 above the handles is exteriorly threaded to receive an interiorly threaded stem protector 98.

Figure 2:
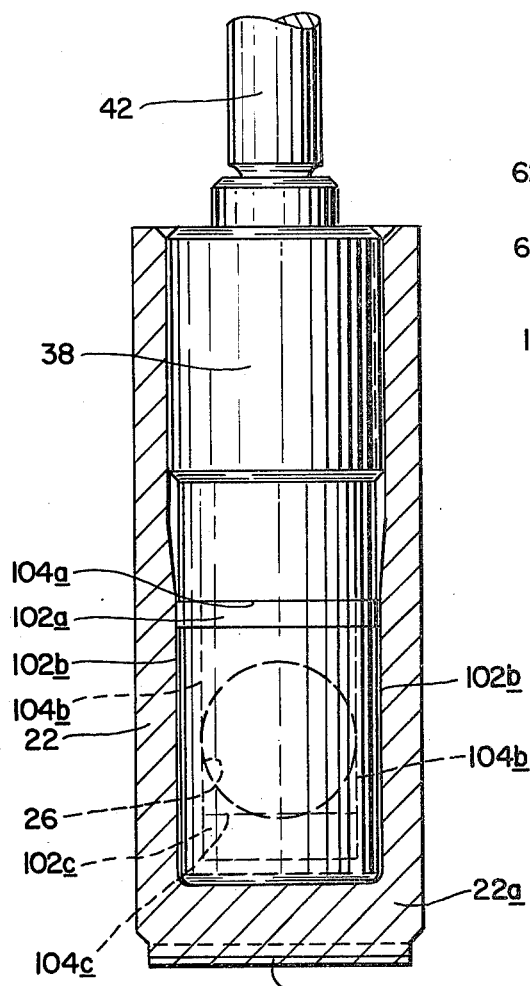
FIG. 2 is a fragmentary sectional view with parts in elevation on a larger scale showing a portion of the FIG. 1 valve in greater detail.
Figure 3:
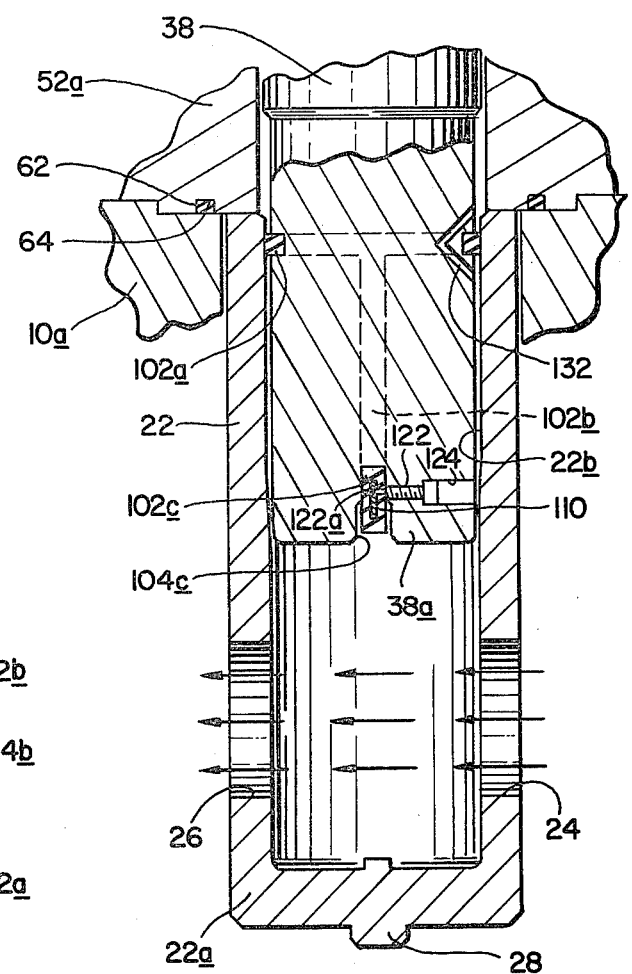
FIG. 3 is a sectional view of the portion shown in FIG. 2 but showing the valve gate in its fully opened position.

It will be understood from the aforesaid description that turning the nut 74 by means of handles 92 one way or the other causes the threaded valve stem 42 to move up and down within bonnet 52 which, in turn, moves the gate 38 up and down within sleeve 22. The length of the threaded stem portion and the pitch of its threads are such that gate 38 can be moved to a retracted or open position wherein its lower end 38a is positioned above the side openings 24 and 26 in sleeve 22 as shown in FIG. 3 to a closed position wherein the gate end 38a is positioned below those openings and in fact seats against the bottom wall 22a of sleeve 22 as shown in FIGS. 1 and 2. As shown in FIG. 1, a circular seal 99 is seated in a groove 100 at the top of gate 38. In the fully open position of the gate, that seal is compressed against a shoulder 101 in bonnet passage 48 to seal off the valve when changing the stem packing 66 under pressure, an API requirement.

As best seen in FIGS. 1, 3, 6 and 7, a special seal shown generally at 102 in FIG. 7 is located in seal recesses in the piston-type gate 38. The seal is a single unit of elastomeric material and includes a circular section 102a which seats in a circular recess 104a extending around gate 38 at a point thereon which is appreciably above the sleeve openings 24 and 26 when the gate is in its closed position shown in FIG. 1. The seal also includes a pair of vertical sections 102b which extend from diametrically opposite points on section 102a in a direction perpendicular to the plane of that section. These seal sections project out from a pair of lengthwise grooves 104b formed in the side wall of gate 38 at diametrically opposite locations thereon. These lengthwise seal sections extend to the lower end of gate 38 where they connect to opposite ends of a transverse seal section 102c which is recessed into a slot 104c formed in the lower gate end 38a.

The gate 38 is oriented so that the plane defined by seal sections 102b and 102c is disposed more or less at right angles to the axis of the sleeve openings 24 and 26 and section 102c is disposed directly above and in register with the raised key 23 at the lower end of the sleeve. An alignment key 106 projecting out from sleeve 22 at the top thereof mates with a vertical slot or keyway 108 formed in the side wall of gate 38 to maintain that orientation of the gate.

Figure 4:
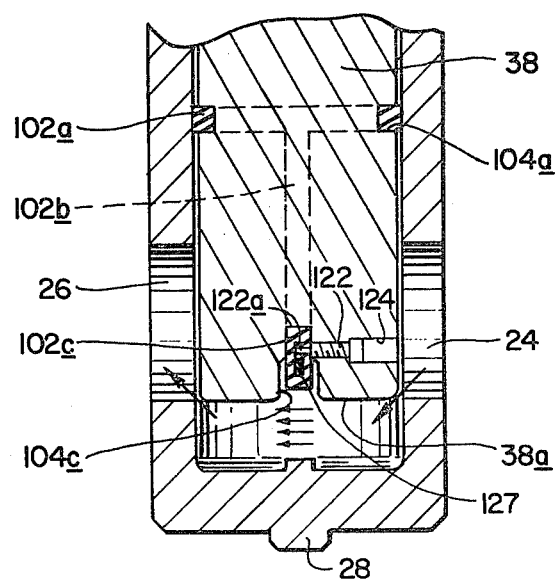
FIG. 4 is a view similar to FIG. 3 but showing the gate in its partially closed position.

The seal sections 102a and 102b are arranged so that they project from their respective grooves sufficiently to engage the inside wall of sleeve 22 and establish a fluid tight sliding fit therewith even when the gate is partially closed as shown in FIG. 4. On the other hand, the seal section 102c at the end of the gate 38 is recessed into its groove 104c so that it does not receive compression until the gate assumes its fully closed position as will be described presently.

Furthermore while the sections 102a and 102b are solid lengths of elastomeric material, the seal section 102c has a stiff nonextensible metal insert 110 molded into its elastomeric material to maintain that section as a rigid unit. Also seal section 102c is fastened to the end of the gate 38 at the side of its slot 104c to prevent elongation of the vertical seal sections 102b when the valve is closed. Without such reinforcement, the ends of the lower seal section 102c might be pushed out of its recess 104c causing valve leakage. As best seen in FIGS. 3, 4 and 7, the securement between seal section 102c and the gate is achieved by means of an Allen-type setscrew 122 of the self-locking type (Nylok) turned down into a threaded opening 124 in the upstream, vertical wall of slot 104c. Screw 122 has a cylindrical extension or pin 122a which projects into an opening 126 in the side of seal section 102c, thereby preventing vertical elongation of seal sections 102b and bending or displacement of the seal section 102c. Opening 126 should, of course, not penetrate through the seal to avoid the possibility of leakage. Also as best seen in FIGS. 3 and 4, opening 126 should be slightly vertically elongated to provide a small (e.g. 1/16 inch) gap 127 to allow for vertical compression of the seal.

As mentioned previously, the gate 38 can be moved between an opened position illustrated in FIG. 3 and a closed position shown in FIGS. 1 and 2. When the gate is in its open position, fluid is able to flow freely between the inlet and outlet openings 24 and 26 in sleeve 22 under gate 38 as indicated by the arrows in FIG. 3. Since the seal section 102c at the bottom of the gate is recessed into its slot 104c, that seal section is not eroded or damaged due to such flow. Preferably, the upper portion 22b of the inside wall of sleeve 22 is relieved or enlarged as illustrated in FIG. 3 so that when the gate is in that open position the compression on the seal sections 102a and 102b is relieved to minimize seal wear and to facilitate movement of the gate.

As the gate 38 is extended in order to close the valve, the end of the gate intercepts the sleeve openings 24 and 26 to an ever greater extent so that the fluid velocity between the lower edge of the gate and the lower edges of openings 24 and 26 gradually increases, becoming a maximum when the gate end is directly above the lowermost points on those opening edges as shown in FIG. 4. At that instant, the fluid flow occurs through very small cracks or point openings at the opposite edges of the gate as indicated by the large vectors in FIG. 4. That flow has a very high velocity and may cause some damage to the hardened steel areas located at the lower inside edges of the inlet and outlet sleeve openings 24 and 26 and the opposite portions of the gate bottom edge.

Actually, the pressure of the fluid at the inlet opening 24 against the gate 38 forces the gate against the downstream inside surface of sleeve 22. Thus to the extent of the diametral clearance between the gate and sleeve (typically 0.030 inch), the flow area upon closing or opening of the gate may be significantly less at the downstream window at the point just before the gate closes that window. Consequently, the maximum pressure drop occurs at the downstream window-gate edge and consequently the greatest fluid velocity damage occurs at that location. In any event, the fluid velocity across the end of the gate past the seal section 104c is relatively small and indeed many times less than the fluid velocity through the decreasing gaps or windows during valve closure due to the much greater flow area at that location as illustrated by the small vectors in FIG. 4.

Thus as gate 38 moves toward its fully closed position, it blocks the upstream sleeve opening 24 so that fluid flow through the sleeve under the gate is reduced to a minimum. Further as noted above, the fluid forces the gate against the downstream inside wall of the sleeve. This tends to form a metal-to-metal seal below the outlet opening 26 which further reduces flow through the sleeve to a negligible amount as the valve gate proceeds downward toward its fully closed position shown in FIGS. 1 and 2. Finally, as the gate reaches its fully closed position, the seal section 102c is compressed against the raised key 23 at the bottom of the sleeve causing the seal to deform to provide a fluid tight seal between the end of the gate and the bottom of the sleeve.

In this connection, it should be mentioned that the cross section of the slot 104c should be larger than that of the seal section 102c in order to permit such deforming and flowing of the seal upon its compression against the key. Since the seal is recessed, it cannot extrude underneath the gate bottom due to such compression or due to the pressure differential across the seal section at closing. Thus when the gate is fully closed as shown in FIGS. 1 and 2, fluid flow from the inlet opening 24 across the top of the gate is prevented by the seal section 102a, while seal sections 102b prevent such flow around the piston. Fluid flow under the gate is of course prevented by the seal section 102c compressed against key 23.

Preferably, means are provided in the subject valve to establish a preferred flow direction for the valve to facilitate its opening and closing. More particularly and referring to FIGS. 1 and 3, a pressure equalization passage 132 is formed in gate 38 bypassing seal section 102a at the upstream side of the gate. Thus when the gate is in its fully closed position shown in FIG. 1, fluid at the inlet pressure acts across the entire top of the gate exerting a downward force on the gate. On the other hand, the bottom section of the gate under seal section 102a receives fluid pressure only over approximately one-half of its surface area since the seal sections 102b are situated midway across the face of the gate. Thus the net downward load on the gate acts continually to bias the gate to its fully closed and sealed position.

However, once the gate is opened slightly initially, fluid is free to flow under the gate so that pressure acts across the entire lower surface of the gate thereby equalizing the pressure above and below seal section 102a and facilitating further opening of the gate. If desired, such flow preference can be eliminated by providing two equalization passages in the gate and fitting them with check valves. However, that option is not too desirable because it raises certain problems which make the valve less reliable.

From the drawings it is apparent that the various openings in the valve parts are all circular or cylindrical and therefore can be drilled easily so that the costs of the various parts are kept to a minimum. Also, the valve can be disassembled as necessary quite easily in order to repair or replace the various parts therein. For example, replacement of the seal 102 simply involves removing the bonnet 52 by disengaging nuts 58 which permits the entire top section of the valve to be removed from the valve housing, thereby exposing the end of the gate 38. The seal 102 can then be removed easily from its slots 104 and replaced by a new seal. By the same token, the entire gate 38 can be removed and replaced simply by loosening lock nut 46 and unscrewing the gate from its stem 42, after which the bonnet can be resecured to the valve housing.

It will be apparent from the foregoing, then, that my gate valve is particularly effective as a flow controller in high fluid pressure applications. Due to the unique construction of its gate and gate seals, the repeated opening and closing of the valve does not cause damage to those seals. As a result, the valve can be used for a prolonged period without requiring maintenance or repair. Yet the valve is composed of easily constructed parts. Therefore it is relatively inexpensive to make and should therefore find wide application wherever high pressure fluids have to be controlled, such as in oil fields, hydroelectric plants, or similar installations.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. An improved gate valve comprising
   A. valve housing,
   B. means defining aligned inlet and outlet passages in said housing,
   C. means defining a well intercepting the inlet and outlet passages, said well being closed at one end and open at its opposite end,
   D. a piston-type gate slidably positioned in the well, said gate being slidable between an open position wherein it is positioned away from the closed end of the third passage and does not intercept the inlet and outlet passages to a closed position wherein the gate seats against the closed end of the third passage and blocks said passages,
   E. first seal means extending around the perimeter of the gate above said inlet and outlet passages to prevent fluid flow from the inlet passage past one end of the gate adjacent the open end of the well,
   F. second seal means extending lengthwise along the gate at opposite sides thereof, said second seal means extending from the first seal means to the other end of the gate opposite the closed end of the wall, said second seal means defining a plane which separates the inlet and outlet passages in the housing so as to prevent fluid flow from the inlet passage around the perimeter of the gate,
   G. means defining a slot in said other end of the gate and extending between the free ends of the second seal means, H. third seal means positioned in the slot and having its opposite ends connected to the free ends of the second seal means, I. a raised key projecting out from the closed end of the well toward the gate, said key being in register with the gate slot and substantially coextensive with the third seal means so that when the gate is moved to its fully closed position after having intercepted the inlet and outlet passages, the third seal means is compressed against the key preventing fluid flow from the inlet passage past said other gate end, and J. means for moving the gate between its open and closed positions.

2. The valve defined in claim 1 wherein the moving means comprises
   A. screw means attached to said one end of the gate,
   B. a nut threadedly engaged with the screw and rotatively secured to the housing, and
   C. means for rotating the nut.

3. The valve defined in claim 1 and further including a pressure equalization passage formed in the gate, said passage having its opposite ends located at the side wall of the gate at opposite sides of the first seal means.

4. The valve defined in claim 1 wherein said first, second and third seal means are formed as a unitary piece of elastomeric material comprised of a ring section, a pair of lengthwise sections projecting perpendicularly from diametrically opposite locations on the ring section and a transverse section connecting the free ends of the lengthwises section.

5. The valve defined in claim 4 wherein the transverse seal section includes a non-extensible rigid member molded into it to prevent that seal section from bending.

6. The valve defined in claim 5 and further including fastening means between the transverse seal section and the gate to prevent the transverse seal section from shifting in said slot.

7. The valve defined in claim 1 wherein a lengthwise section of the well near its open end is enlarged so as to relieve the compression on the first and second seal means when the gate is in its open position.

8. The valve defined in claim 1 and further including means for preventing rotation of said gate in said well while permitting its sliding movement therein.

9. The valve defined in claim 1 wherein the third seal means is recessed into said slot.

10. The valve defined in claim 1 wherein the gate slot is wider than the third seal means in it uncompressed state so that the third seal means is free to deform laterally in the slot when compressed against the key.

* * * * *